United States Patent
Ishida et al.

(10) Patent No.: US 7,956,593 B2
(45) Date of Patent: Jun. 7, 2011

(54) POWER GENERATION CIRCUIT USING ELECTROMAGNETIC WAVE

(75) Inventors: Makoto Ishida, Aichi (JP); Kazuaki Sawada, Aichi (JP); Hidekuni Takao, Aichi (JP); Minoru Sudo, Chiba (JP)

(73) Assignees: Makoto Ishida (JP); Seiko Instruments Inc. (JP)

( * ) Notice: Subject to any disclaimer, the term of this patent is extended or adjusted under 35 U.S.C. 154(b) by 1730 days.

(21) Appl. No.: 11/121,262

(22) Filed: May 3, 2005

(65) Prior Publication Data

US 2005/0254183 A1    Nov. 17, 2005

(30) Foreign Application Priority Data

May 12, 2004  (JP) ................................ 2004-141817
Apr. 20, 2005  (JP) ................................ 2005-122007

(51) Int. Cl.
*G05F 1/00*          (2006.01)
(52) U.S. Cl. ........................................ 323/284; 323/285
(58) Field of Classification Search .................. 257/330; 438/270; 323/284, 285, 906, 288, 301, 302; 320/132, 133, 134, 143, 158, 163; 322/24, 322/25, 27, 28
See application file for complete search history.

(56) References Cited

U.S. PATENT DOCUMENTS

| | | | | |
|---|---|---|---|---|
| 4,195,359 A | * | 3/1980 | Miller et al. | 367/94 |
| 5,276,393 A | * | 1/1994 | Gali | 320/101 |
| 5,515,261 A | * | 5/1996 | Bogdan | 363/89 |
| 5,576,533 A | * | 11/1996 | Tantraporn | 250/214 R |
| 5,633,565 A | * | 5/1997 | Friedman et al. | 315/200 A |
| 5,850,181 A | * | 12/1998 | Heinrich et al. | 340/572.1 |
| 5,912,552 A | * | 6/1999 | Tateishi | 323/285 |
| 5,962,876 A | * | 10/1999 | Yu | 257/133 |
| 6,398,116 B1 | * | 6/2002 | Kreft | 235/492 |
| 6,448,489 B2 | * | 9/2002 | Kimura et al. | 136/244 |
| 6,525,373 B1 | * | 2/2003 | Kim | 257/330 |
| 6,856,291 B2 | * | 2/2005 | Mickle et al. | 343/701 |
| 6,882,128 B1 | * | 4/2005 | Rahmel et al. | 320/101 |
| 2003/0107483 A1 | * | 6/2003 | Kano | 340/540 |
| 2005/0146220 A1 | * | 7/2005 | Hamel et al. | 307/44 |

* cited by examiner

*Primary Examiner* — Adolf Berhane
*Assistant Examiner* — Emily Pham
(74) *Attorney, Agent, or Firm* — Adams & Wilks (57) ABSTRACT

A power generation circuit generates and stores electric power utilizing electromagnetic wave energy. The power generation circuit has one of an antenna or a coil that receives an electromagnetic wave. A rectifying circuit is formed on a silicon substrate and rectifies a signal from the antenna or the coil. A storage circuit stores an output power obtained from the rectifying circuit for driving a load. A MOS transistor has a source and a drain connected to an output of the storage circuit and the load, respectively, so that the load is connected to the storage circuit in accordance with a threshold voltage of the MOS transistor.

9 Claims, 6 Drawing Sheets

Fig. 12
PRIOR ART

US 7,956,593 B2

POWER GENERATION CIRCUIT USING ELECTROMAGNETIC WAVE

BACKGROUND OF THE INVENTION

1. Field of the Invention

The present invention relates to a circuit that generates and stores electric power utilizing electromagnetic waves.

2. Description of the Related Art

Figure 12:
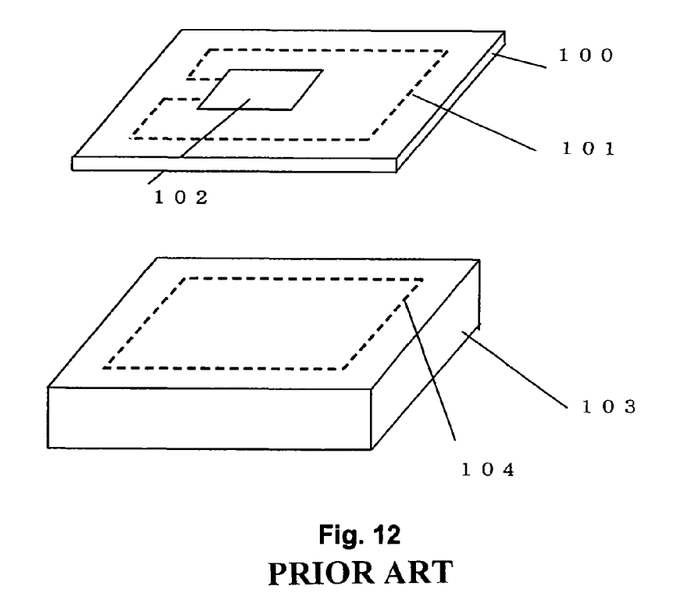
FIG. 12 is an example of a conventional power generation circuit using electromagnetic wave.

A circuit of a non-contact IC card is shown in FIG. 12 as an example of conventional power generation circuits that utilize electromagnetic waves (refer to JP 3418322 B, FIG. 11, for example).

An electromagnetic coupling coil 101 and an IC chip 102 are mounted on a non-contact IC card 100. An IC card reader/writer 103 has an electromagnetic coupling coil 104 for electromagnetically coupling the electromagnetic coupling coil 101 of the IC card 100. The IC card 100 operates by using electric power supplied from the IC card reader/writer 103 through the electromagnetic coupling.

The conventional power generation circuit using electromagnetic waves has a drawback in which means for supplying electric power is necessary. Further, there is a problem in that characteristics of an antenna may change depending on a length of wiring for the antenna when mounted.

SUMMARY OF THE INVENTION

The present invention has been made to solve the above-mentioned problems inherent in the conventional art. It is an object of the present invention to provide a power generation circuit capable of generating electric power by receiving energy from electromagnetic wave which fills space for living.

According to the present invention, a power generation circuit using energy of electromagnetic wave includes: one of an antenna or a coil for receiving an electromagnetic wave; a rectifying circuit formed on a silicon substrate, for rectifying a signal from the antenna or the coil; and a circuit for storing an output power from the rectifying circuit, wherein power generation is performed by utilizing the energy of the electromagnetic wave; and the electromagnetic wave is a commercially available electromagnetic wave.

Further, the present invention provides a power generation circuit using energy of electromagnetic wave, in which a source and a drain of an enhancement MOS transistor are connected between an output of the storing circuit and a load, and control of connecting the storing circuit and the load is performed by utilizing the threshold voltage of the enhancement MOS transistor.

Still further, the present invention provides a power generation circuit using energy of electromagnetic wave, in which; a recess is formed in the silicon substrate; a projecting terminal which conforms to a shape of the recess in the silicon substrate is formed on one of the antenna or the coil; and an electrical connection is established between the antenna and an element formed on the silicon substrate by inserting the projecting terminal of the antenna or the coil into the recess in the silicon substrate.

Yet further, the present invention provides a power generation circuit using energy of electromagnetic wave, in which the electromagnetic wave exists in a space for living.

Furthermore, the present invention provides a power generation circuit using energy of electromagnetic wave including: one of an antenna or a coil for receiving an electromagnetic wave; a rectifying circuit formed on a silicon substrate, for rectifying a signal from one of the antenna or the coil; a booster circuit for boosting an output of the rectifying circuit; a storage circuit for storing an output power from the booster circuit; a detecting circuit for detecting a voltage of the storage circuit; and a switching circuit for connecting the storage circuit and a load, wherein power generation is performed by utilizing the energy of the electromagnetic wave; and the switching circuit is turned on to connect the storage circuit and the load when the detecting circuit detects that the voltage of the storage circuit is equal to or greater than a predetermined voltage.

Further, the present invention provides a power generation circuit using energy of electromagnetic wave, including: one of an antenna or a coil for receiving an electromagnetic wave; a rectifying circuit formed on a silicon substrate, for rectifying a signal from one of the antenna or the coil; a booster circuit for boosting an output of the rectifying circuit; a storage circuit for storing an output power from the booster circuit; a detecting circuit for detecting a voltage of the storage circuit; a switching circuit for connecting the storage circuit and a load; and a mono-stable multi-vibrator circuit whose input is a signal from the detecting circuit, wherein power generation is performed by utilizing the energy of the electromagnetic wave; and the switching circuit is turned on for a defined period of time determined by the mono-stable multi-vibrator circuit when the detecting circuit detects that the voltage of the storage circuit is equal to or greater than a defined voltage to connect the storage circuit and the load.

Further, the present invention provides a power generation circuit using energy of electromagnetic wave, including: one of a first antenna or a first coil for receiving an electromagnetic wave of a first frequency; a first rectifying circuit formed on a silicon substrate, for rectifying a signal from one of the first antenna or the first coil; a booster circuit for boosting an output of the first rectifying circuit; an storage circuit for storing an output power from the booster circuit; a switching circuit for connecting the storing circuit and a load; one of a second antenna or a second coil for receiving an electromagnetic wave of a second frequency different from the electromagnetic wave of the first frequency received by the first antenna or the coil; and a second rectifying circuit formed on the silicon substrate, for rectifying a signal from one of the second antenna or the second coil, wherein one of the first antenna or the coil performs power generation by utilizing the energy of the electromagnetic wave of the first frequency; the energy is stored in the storage circuit; and the switching circuit is turned on to connect the storage circuit and the load, when power generation is performed by the second rectifying circuit after receiving the electromagnetic wave of the second frequency, which has a different frequency from the electromagnetic wave of the first frequency, by the second antenna or the second coil.

Moreover, the present invention provides a power generation circuit using energy of electromagnetic wave, including: one of a first antenna or a first coil for receiving an electromagnetic wave; a first rectifier circuit formed on a silicon substrate, for rectifying a signal from the first antenna or the first coil; a booster circuit for boosting an output from the first rectifying circuit; an storage circuit for storing an output power from the booster circuit; a switching circuit for connecting the storage circuit and a load; one of a second antenna or a second coil for receiving an electromagnetic wave having a different frequency than the frequency of the electromagnetic wave received by the first antenna; a second rectifying circuit formed on the silicon substrate, for rectifying a signal from one of the second antenna or the second coil; and a mono-stable multi-vibrator circuit whose input is a signal from the second rectifying circuit, wherein one of the first antenna and the first coil performs power generation utilizing the energy of the electromagnetic wave; the energy is stored in the storage circuit; and the switching circuit is turned on for a defined period of time determined by the mono-stable multi-vibrator circuit to connect the storage circuit and the load, when power generation is performed by the second rectifier circuit after receiving an electromagnetic wave, which has a different frequency from the frequency of the electromagnetic wave received by the first antenna or the first coil, by one of the second antenna or the second coil.

A power generation circuit using electromagnetic wave according to the present invention is effective since generation of a specific energy is not needed to perform power generation.

DETAILED DESCRIPTION OF THE PREFERRED EMBODIMENTS

In order to solve the problems described above, power generation is performed by utilizing electromagnetic wave in space for living in this invention.

Embodiments of the present invention are explained below with reference to the drawings.

First Embodiment

Figure 1:
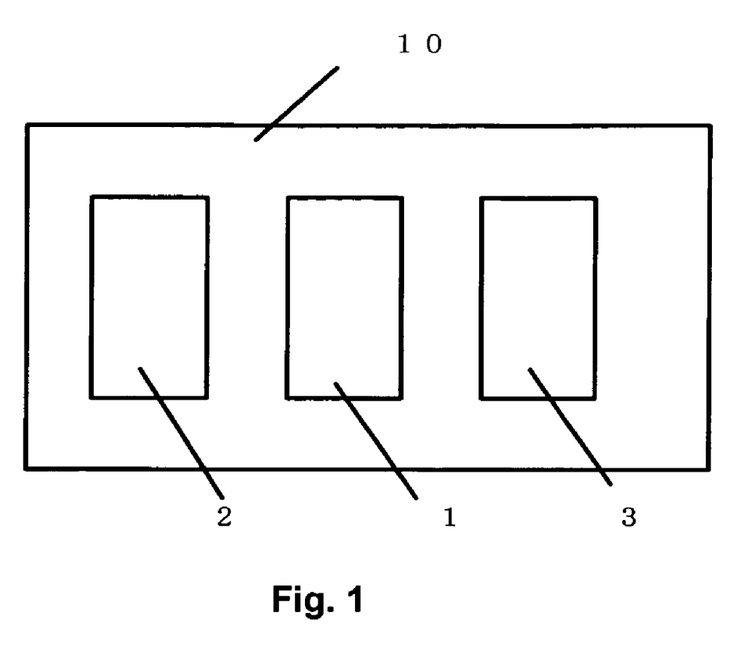
FIG. 1 is a plan view showing a power generation circuit using electromagnetic wave according to a first embodiment of the present invention.

FIG. 1 is a power generation circuit using electromagnetic wave according to a first embodiment of the present invention.

An antenna or a coil 2, a rectifying circuit 1, and a storage circuit 3 are mounted on a substrate 10. A capacitor, for example, may be used instead of the storage circuit 3.

Figure 2:
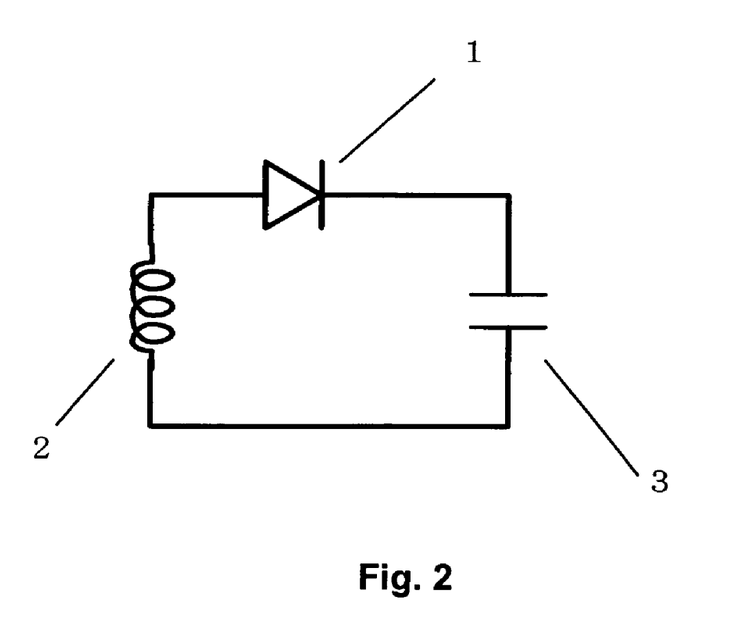
FIG. 2 is an example of the power generation circuit using electromagnetic wave according to the first embodiment of the present invention.

FIG. 2 shows a specific example of a power generation circuit using electromagnetic wave. A coil 2 serving as the antenna 2, a Schottkey barrier diode (hereinafter called "SBD") serving as the rectifying circuit 1 and a capacitor 3 serving as the storage circuit 3 are connected therebetween.

The coil 2 receives the energy supplied from a commercially available electromagnetic wave such as an electromagnetic wave for a cellular telephone, TV broadcasting, or FM radio broadcasting. The SBD 1 rectifies a voltage generated in the coil 2 to inject electric charge into the capacitor 3.

Kind and strength of the commercially available electromagnetic wave differ greatly depending upon location and time. However small and weak an available electromagnetic wave is, the circuit shown in FIG. 2 can charge little by little the capacitor 3. Accordingly, even in the location of the weak electromagnetic wave, the capacitor 3 will be charged over a long period of time, and the charge is accumulated in the capacitor 3. Consequently it is possible to drive a load by utilizing the charge in the capacitor 3 by connecting the load across both terminals of the capacitor 3.

Second Embodiment

Figure 3:
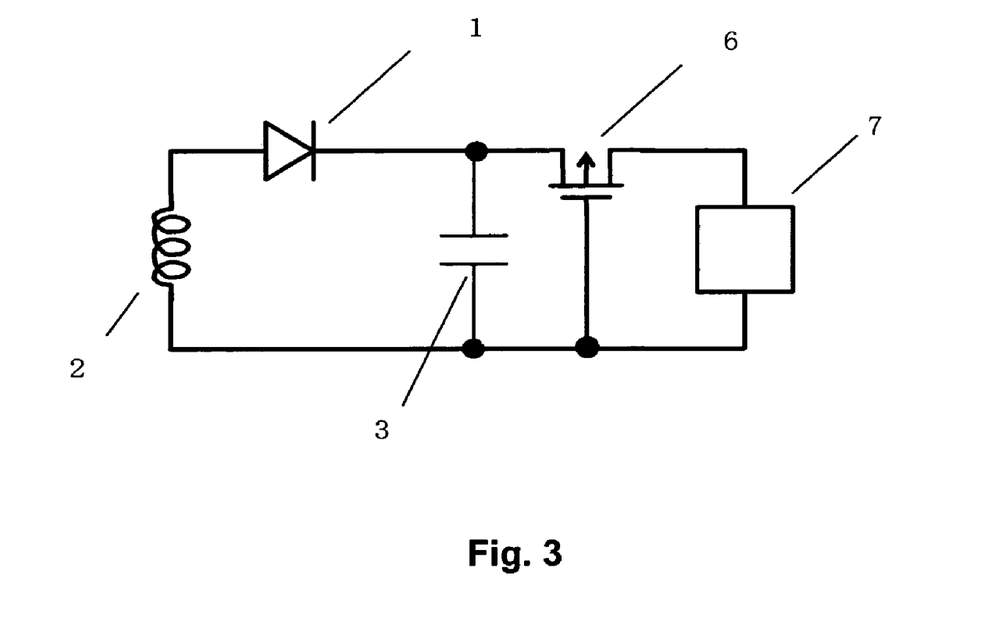
FIG. 3 is a power generation circuit using electromagnetic wave according to a second embodiment of the present invention.

FIG. 3 is a power generation circuit using electromagnetic wave according to a second embodiment of the present invention.

A coil 2, a SBD 1, and a capacitor 3 are connected similar to those of FIG. 2. A source of a P-channel MOS transistor 6 is connected to a positive terminal of the capacitor 3, and a drain of the P-channel MOS transistor 6 is connected to a load 7. A gate of the MOS transistor 6 is connected to a negative terminal of the capacitor 3.

Connecting in this way, the MOS transistor 6 turns onto connect the load 7 to the capacitor 3 in parallel and the energy of the capacitor 3 can drive the load 7 when the voltage accumulating in the capacitor 3 becomes higher than the threshold voltage of the MOS transistor 6.

The MOS transistor 6 is in an off-state when the voltage of the stored charge in the capacitor 3 is less than the threshold voltage of the MOS transistor 6, and no electric power is consumed. In this circuit detection of the voltage accumulated by electromagnetic wave can be performed without electric power consumption, and the connection of the load can be controlled when the voltage of the capacitor 3 reaches a given voltage. Adjustment of the threshold voltage of the MOS transistor enables the adjustment of the voltage for connecting the capacitor 3 and the load 7.

Figure 4:
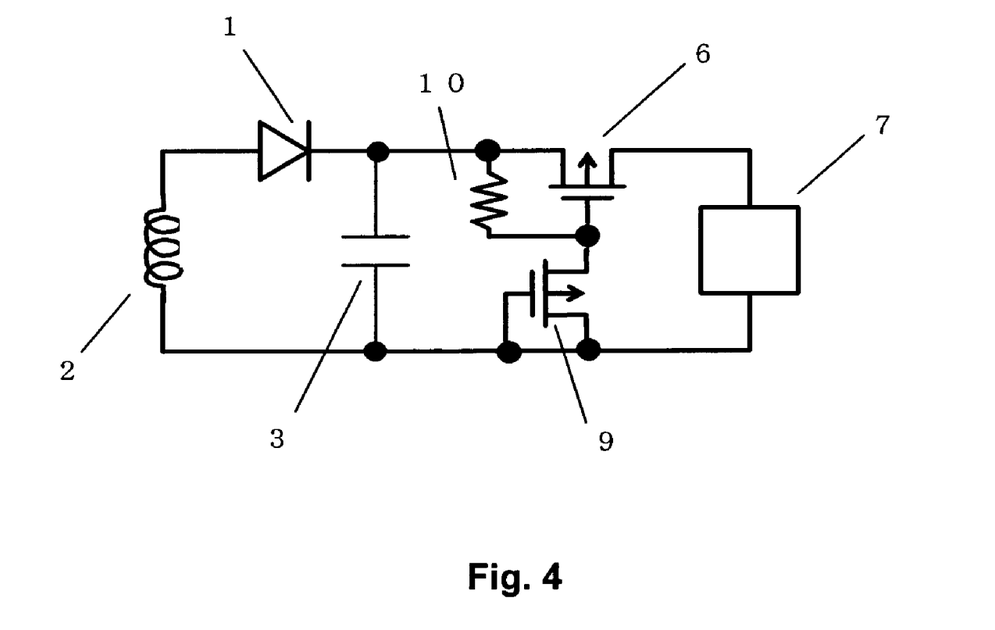
FIG. 4 is the power generation circuit using electromagnetic wave according to the second embodiment of the present invention.

In addition, as shown in FIG. 4, it is also possible to adjust the voltage for connecting the capacitor 3 and the load 7; a MOS transistor 9 having a drain connected to a gate is connected to a gate of the MOS transistor 6, and a high-resistance resistor 10 is connected between the gate and the source of the MOS transistor 6. In this circuit, connection of the capacitor 3 and the load 7 is established when the capacitor 3 is charged so that the voltage across the capacitor 3 reaches a voltage equal to the sum of the threshold voltage of the MOS transistor 6 and the threshold voltage of the MOS transistor 9.

Figure 5:
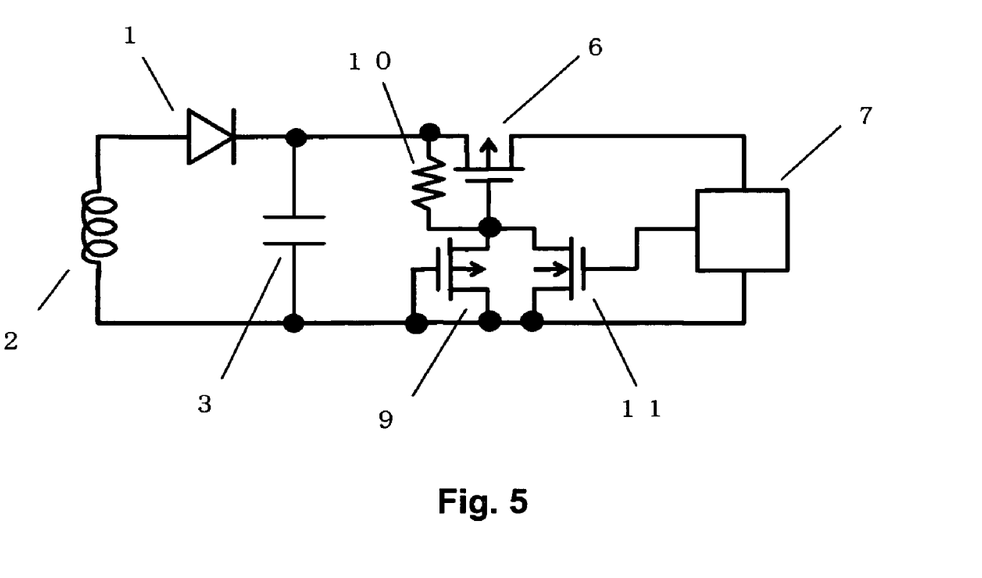
FIG. 5 is the power generation circuit using electromagnetic wave according to the second embodiment of the present invention.

Further, as shown in FIG. 5, a drain and a source of a MOS transistor 11 serving as a switch are connected to the drain and the source, respectively, of the MOS transistor 9 of FIG. 4 whose gate is connected to the drain. When the capacitor 3 is charged to a voltage equal to the sum of the threshold voltages of the MOS transistor 6 and the MOS transistor 9, the transistor 11 serving as a switch is turned on according to a signal from a control circuit contained in the load 7 at the moment when the capacitor 3 and the load 7 are connected. Accordingly, the connection between the capacitor 3 and the load 7 can be maintained till the voltage of the capacitor 3 drops below the threshold voltage of the MOS transistor 6.

Figure 6:
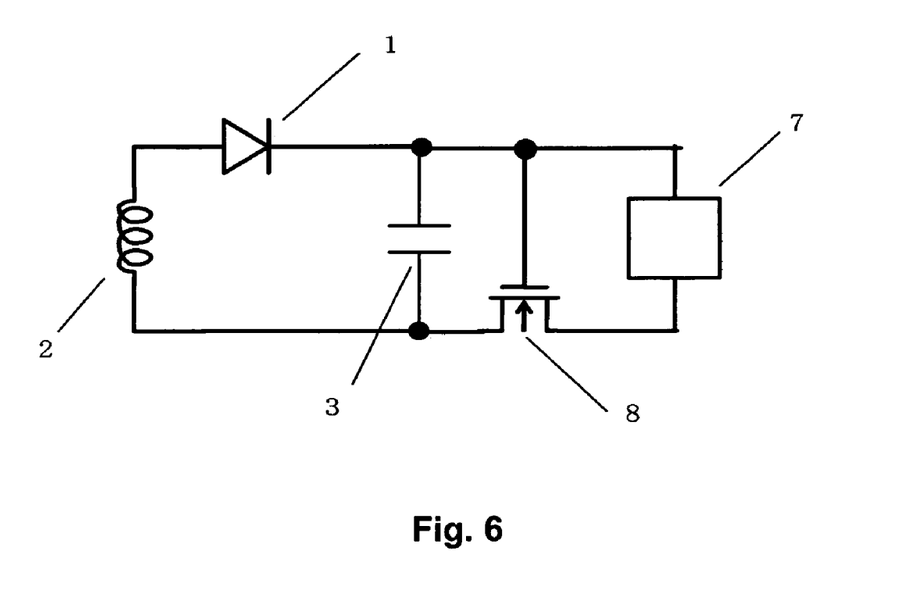
FIG. 6 is the power generation circuit using electromagnetic wave according to the second embodiment of the present invention.

Further, as shown in FIG. 6, an N-channel MOS transistor 8 can be used as a substitute for a P-channel MOS transistor. In this case, a source of the MOS transistor 8 is connected to the negative terminal of the capacitor 3, a gate of the MOS transistor 8 is connected to the positive terminal of the capacitor 3, and the load 7 is connected to the positive terminal of the capacitor 3 and to a drain of the MOS transistor 8. In this structure, when the voltage across the terminals of the capacitor 3 becomes higher than the threshold voltage of the MOS transistor 8, the MOS transistor 8 turns on and thus connects the capacitor 3 and the load 7.

As an application of the power generation circuit using electromagnetic waves according to the present invention, failure diagnosis of a mechanical component or an electrical component (such as a motor) can be achieved without a battery. For example, the resonant frequency, with which power generation is most effective, in FIG. 3 is set to the frequency of an electromagnetic wave that is generated at the time when the failure occurs to the mechanical component or to the electrical component. In this case, when the mechanical component or the electrical component fails, an electromagnetic wave having a certain frequency will be generated. Upon receiving the electromagnetic wave, the power generation circuit according to the present invention generates power, and an electric power is supplied to a circuit (load 7) which sends a notification of an abnormality of the mechanical part or the electrical part. In this manner failure diagnosis of a mechanical component or an electrical component can be achieved without a battery.

Third Embodiment

Figure 7:
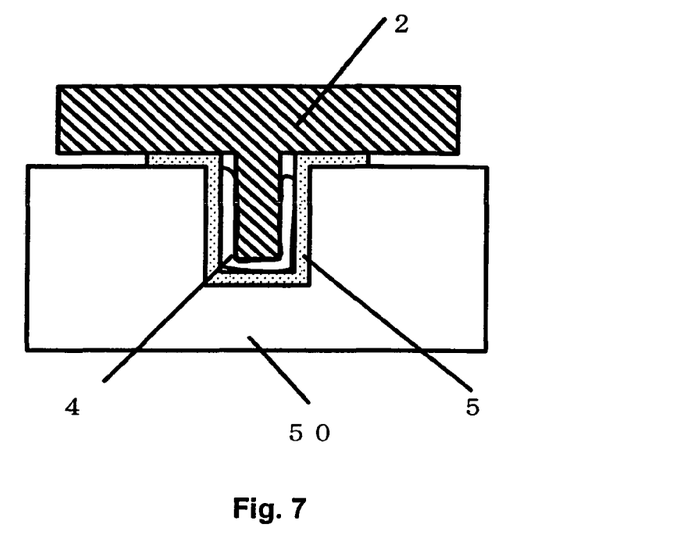
FIG. 7 is a power generation circuit using electromagnetic wave according to a third embodiment of the present invention.

FIG. 7 is a power generation circuit using electromagnetic wave according to a third embodiment of the present invention.

A rectifying circuit and elements such as a capacitor, a resistor, or a MOS transistor are fabricated on a silicon substrate 50 by silicon planar process. In addition, a recess is formed in the silicon substrate 50 by anisotropic dry etching of silicon such as deep reactive ion etching (DRIE), or by anisotropic wet etching employing a material such as tetramethylammonium hydroxide (TMAH). When the recess is formed by DRIE, the recess is formed substantially perpendicular with respect to the silicon substrate, as shown in FIG. 7. When the recess is formed by wet etching, the recess is generally formed with a certain angle with respect to the substrate.

On the other hand, there is a projecting terminal on the antenna 2. The projecting terminal is inserted into the recess of the silicon substrate 50. The depth and the size of the recess of the silicon substrate 50 are adjusted depending upon the size of the projecting terminal of the antenna 2 that is inserted into the recess.

As an example of a method of fixing the silicon substrate 50 with the antenna 2, a metal interconnection, an interconnection using high concentration diffusion or a polysilicon interconnection is formed in advance in the recess of the silicon substrate 50, the interconnection 5 being connected to elements formed on a surface of the silicon substrate 50. A low melting metal or a conductive adhesive 4 is provided to a portion in the recess of the silicon substrate 50 at which the terminal of the antenna 2 makes contact, when the antenna 2 is inserted into the recess. Then the antenna 2 is inserted into the recess of the silicon substrate 50 in this state, the projecting terminal of the antenna 2 and the wiring 5 are electrically connected by the conductive adhesive 4. As a result, the antenna 2 is electrically connected to the elements formed on the surface of the silicon substrate 50.

In prior art, the receiving sensitivity of an antenna may change greatly depending upon the wiring length between the antenna and the rectifier. However, with this structure, the connection between the antenna and the semiconductor element can be made with a minimum wiring length. In addition, the power generation circuit using electromagnetic wave can be made smaller.

Further, according to the present invention, the power generation can be made using not only commercially available electromagnetic waves such as those generated from cellular telephones, TV broadcasts, and FM radio broadcasts but also an electromagnetic wave which is generated by fluorescent light, office automation equipment or the like and which fills a space of living. Furthermore, the power generation may also be possible using a specific electromagnetic wave which is generated when a mechanical component or an electrical component fails.

Further, although an example of a rectifying circuit and a storage circuit is shown in FIG. 2, the present invention is not limited to these circuits. Any structure may be employed using any means as long as having a rectifying function and a charge storing function.

Fourth Embodiment

Figure 8:
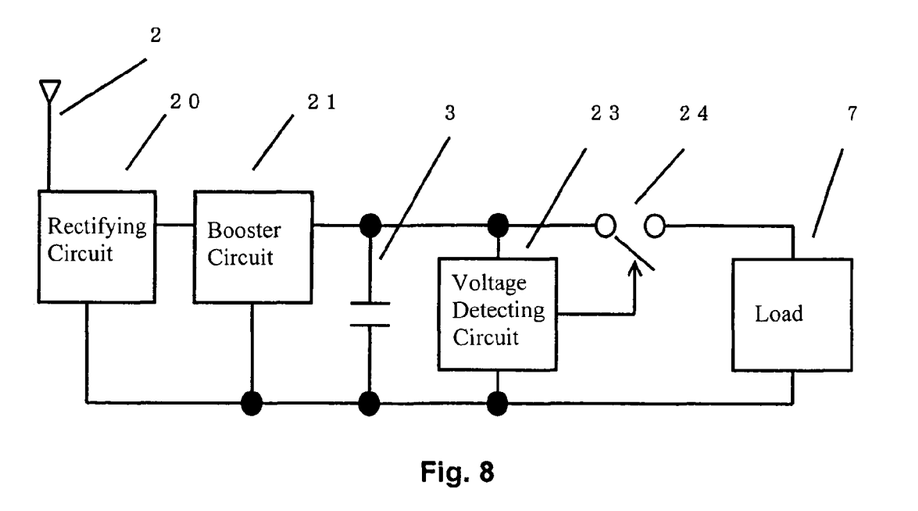
FIG. 8 is a power generation circuit using electromagnetic wave according to a fourth embodiment of the present invention.

FIG. 8 is a power generation circuit using electromagnetic wave according to a fourth embodiment of the present invention.

After an antenna or coil 2 receives an electromagnetic wave and power generation is performed, a rectifying circuit 20 performs rectification, converting an alternating current voltage into a direct current voltage, and a booster circuit 21 boosts the voltage level. In general, the booster circuit 21 boosts the voltage to a level at which a load 7 can operate since the voltage generated by the antenna or coil 2 is low when the electromagnetic wave is weak. The boosted voltage is accumulated in the storage circuit 3. A voltage detector circuit 23 detects the voltage of the storage circuit 3. When the voltage of storage circuit 3 increases to an arbitrary voltage determined by the voltage detecting circuit, a switching circuit 24 turns from off to on, connecting the storage circuit 3 and the load 7.

According to the present invention, even when power generation is performed by a weak electromagnetic wave, the voltage is boosted to a level sufficient to drive the load by the booster 21, and the boosted voltage is detected by the voltage detecting circuit 23. After the voltage has been reached to the voltage sufficient to drive the load, the voltage is supplied to the load 7 through the switching circuit 24. Accordingly, wrong operation of the load 7 can be positively prevented.

Further, electric power is supplied to the load 7 at an instant when the switching circuit 24 turns on, there is a fear in that the voltage of the storage circuit 3 may decrease to cause the switching circuit 24 to return to off-state, and then the on-state and off-state may alternately appear. However, disposing hysteresis to the voltage detecting circuit 23 can prevent such action.

Fifth Embodiment

Figure 9:
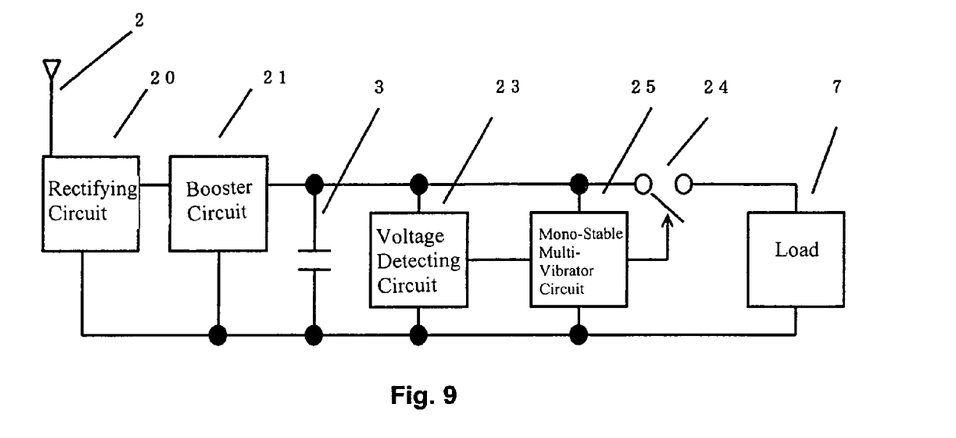
FIG. 9 is a power generation circuit using electromagnetic wave according to a fifth embodiment of the present invention.

FIG. 9 is a power generation circuit using electromagnetic wave according to a fifth embodiment of the present invention. Differing from the power generation circuit using electromagnetic wave shown in FIG. 8, output from the voltage detector circuit 23 is connected to a mono-stable multi-vibrator circuit 25, and the mono-stable multi-vibrator circuit 25 controls the switching circuit 24. In other words, a trigger signal is imparted to the mono-stable multi-vibrator 25 by a signal having an arbitrary voltage detected by the voltage detecting circuit 23, and the mono-stable multi-vibrator 25 turns on the switching circuit 24 for a given period of time set in advance.

With this structure, it becomes possible to supply electric power to the load 7 for only a necessary period of time by setting the time period held in the mono-stable multi-vibrator so that the switching circuit 24 is turned on only for a processing period during which the load can perform certain processes. Wasteful energy consumption of the storage circuit 3 can thus be suppressed.

Sixth Embodiment

Figure 10:
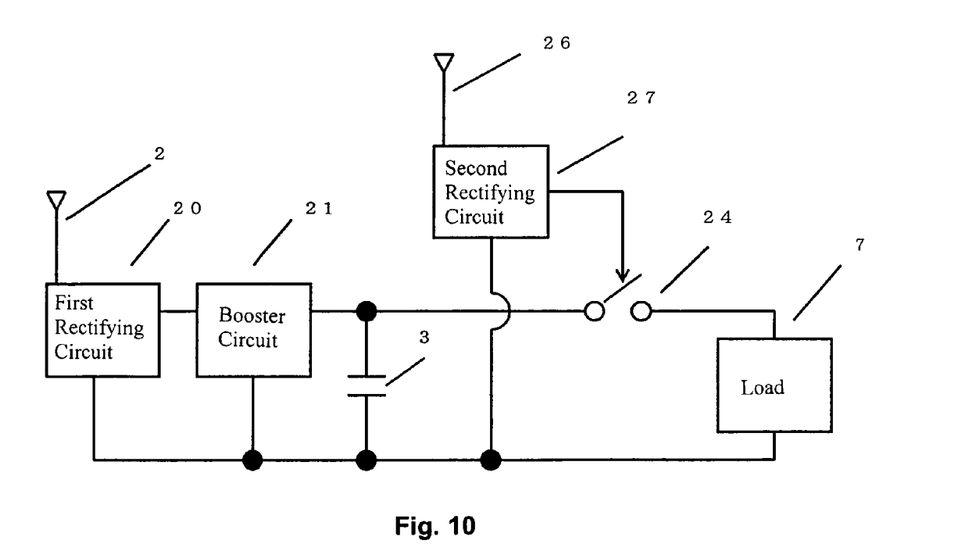
FIG. 10 is a power generation circuit using electromagnetic wave according to a sixth embodiment of the present invention.

FIG. 10 is a power generation circuit using electromagnetic wave according to a sixth embodiment of the present invention. Differing from the power generation circuit using electromagnetic wave shown in FIG. 8, voltage generated by a second antenna or a second coil 26, not the output of the voltage detecting circuit 23, is rectified by a second rectifying circuit 27, and the rectified voltage turns on the switching circuit 24.

For example, the first antenna or the first coil 2, the first rectifying circuit 20, and the booster circuit 21 is constructed so as to always receive an electromagnetic wave to store the electric power to the storage circuit 3. In contrast, the second antenna or the second coil 26 is constructed so as to react only to an electromagnetic wave having a specific frequency to generate power. It is possible to connect the storage circuit 3 and the load 7 by the switching circuit 24 only when the power is to be supplied to the load 7, by applying a specific electromagnetic wave that reacts to the second antenna and when the electromagnetic wave is received.

The frequency at which the second antenna effectively generates power (resonant frequency) is defined so as to correspond to a frequency of an electromagnetic wave which is generated when a mechanical component or an electrical component is failed. As a result, the second antenna of the present invention generates electricity when the mechanical component or the electrical component fails, and supplies the electric power to the load 7; a circuit that notifies abnormality of the mechanical component or the electrical component. Consequently, failure detection of the mechanical component or the electrical component can be performed without battery.

Seventh Embodiment

Figure 11:
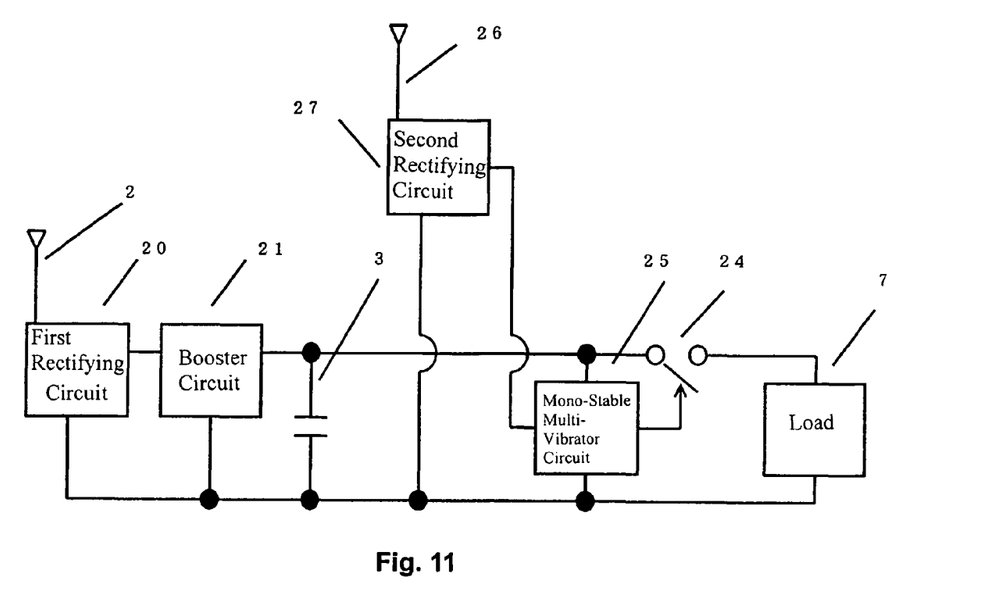
FIG. 11 is a power generation circuit using electromagnetic wave according to a seventh embodiment of the present invention.

FIG. 11 is a power generation circuit using electromagnetic wave according to a seventh embodiment of the present invention. Differing form the power generation circuit using electromagnetic wave shown in FIG. 10, a trigger signal, which is generated by the second antenna or the second coil 26 and is rectified by the second rectifying circuit 27, is imparted to the mono-stable multi-vibrator 25. The switching circuit 24 is turned on for a period of time set in advance by the mono-stable multi-vibrator 25.

In the structure shown in FIG. 10, to hold the switching circuit 24 in an ON-state, it is necessary to keep generating a specific electromagnetic wave to which the second antenna reacts, whereas in the structure shown in FIG. 11, it is not necessary to keep generation of the specific electromagnetic wave.

As explained above, according to the present invention, it becomes possible to provide the power generation circuit using electromagnetic wave that is capable of generating power without energy of the specific electromagnetic wave.

It is possible to use the power generation circuit using electromagnetic wave according to the present invention as a technique of constructing a batteryless electric power source.

What is claimed is:

1. A power generation circuit for generating and storing electric power utilizing electromagnetic wave energy, the power generation circuit comprising:
   one of an antenna or a coil that receives an ambient electromagnetic wave;
   a rectifying circuit that is formed on a silicon substrate and that rectifies a signal from the antenna or the coil receiving the ambient electromagnetic wave;
   a storage circuit that stores an output power obtained from the rectifying circuit for driving a load without the use of a power source or a battery; and
   a MOS transistor having a source and a drain connected to an output of the storage circuit and the load, respectively, so that the load is connected to the storage circuit in accordance with a threshold voltage of the MOS transistor;
   wherein the silicon substrate has a recess, and the antenna or the coil has a projecting terminal that conforms to a shape of the recess in the silicon substrate and extends into the recess to establish an electrical connection between the antenna or the coil and an element formed on the silicon substrate.

2. A power generation circuit for generating and storing electric power utilizing electromagnetic wave energy, the power generation circuit comprising:
   one of an antenna or a coil that receives an electromagnetic wave;
   a rectifying circuit that is formed on a silicon substrate and that rectifies a signal from the antenna or the coil;
   a booster circuit that boosts an output of the rectifying circuit;
   a storage circuit that stores an output power obtained from the booster circuit for driving a load;
   a detector circuit that detects a voltage of the storage circuit;
   a switching circuit that connects the storage circuit to the load in an ON-state of the switching circuit; and
   a mono-stable multi-vibrator circuit that receives an input signal from the detector circuit and that determines a preselected period of time during which the switching circuit is in the ON-state, the switching circuit being in the ON-state for the preselected period of time when the detecting circuit detects that the voltage of the storage circuit is equal to or greater than a preselected voltage to connect the storage circuit to the load.

3. A power generation circuit for generating and storing electric power utilizing electromagnetic wave energy, the power generation circuit comprising:
   one of a first antenna or a first coil that receives an electromagnetic wave of a first frequency;
   a first rectifying circuit that is formed on a silicon substrate and that rectifies a signal from the first antenna or the first coil;
   one of a second antenna or a second coil that receives an electromagnetic wave of a second frequency different from the first frequency;

a second rectifying circuit that is formed on the silicon substrate and that rectifies a signal from the second antenna or the second coil;
a booster circuit that boosts an output of the first rectifying circuit;
a storage circuit that stores an output power obtained from the booster circuit for driving a load; and
a switching circuit that connects the storage circuit to the load;
wherein the first antenna or the first coil performs power generation utilizing the energy of the electromagnetic wave of the first frequency, the energy being accumulated in the storage circuit; and
wherein the switching circuit connects the storage circuit to the load in an ON-state of the switching circuit when power generation is performed by the second rectifying circuit after the second antenna or the second coil receives the electromagnetic wave of the second frequency.

4. A power generation circuit for generating and storing electric power utilizing electromagnetic wave energy, the power generation circuit comprising:
one of a first antenna or a first coil that receives an electromagnetic wave of a first frequency;
a first rectifying circuit that is formed on a silicon substrate and that rectifies a signal from the first antenna or the first coil;
one of a second antenna or a second coil that receives an electromagnetic wave of a second frequency different from the first frequency;
a second rectifying circuit that is formed on the silicon substrate and that rectifies a signal from the second antenna or the second coil;
a booster circuit that boosts an output of the first rectifying circuit;
a storage circuit that stores an output power obtained from the booster circuit for driving a load;
a switching circuit that connects the storage circuit to the load; and
a mono-stable multi-vibrator circuit that receives an input signal from the second rectifying circuit and that determines a preselected period of time during which the switching circuit is in an ON-state;
wherein the first antenna or the first coil performs power generation utilizing the energy of the electromagnetic wave of the first frequency, the energy being stored in the storage circuit; and
wherein the switching circuit is in the ON-state for the preselected period of time determined by the mono-stable multi-vibrator circuit to connect the storage circuit to the load when power generation is performed by the second rectifier circuit after the second antenna or the second coil receives the electromagnetic wave of the second frequency.

5. A power generation circuit for generating and storing electric power utilizing electromagnetic wave energy, the power generation circuit comprising:
one of an antenna or a coil that receives an ambient electromagnetic wave;
a rectifying circuit that is formed on a silicon substrate and that rectifies a signal from the antenna or the coil receiving the ambient electromagnetic wave;
a storage circuit that stores an output power obtained from the rectifying circuit for driving a load without the use of a power source or a battery; and
a MOS transistor having a source and a drain connected to an output of the storage circuit and the load, respectively, so that the load is connected to the storage circuit in accordance with a threshold voltage of the MOS transistor;
wherein when the MOS transistor is in an ON-state, the load is connected to the storage circuit in parallel and the output power stored in the storage circuit drives the load when a voltage accumulating in the storage circuit becomes higher than the threshold voltage of the MOS transistor; and wherein the MOS transistor is in an OFF-state when the voltage accumulated in the storage circuit becomes lower than the threshold voltage of the MOS transistor so that no electric power is consumed.

6. A power generation circuit for generating and storing electric power utilizing electromagnetic wave energy, the power generation circuit comprising:
one of an antenna coil that receives an ambient electromagnetic wave;
a rectifying circuit that is formed on a silicon substrate and that rectifies a signal from the antenna or the coil receiving the ambient electromagnetic wave;
a storage circuit that stores an output power obtained from the rectifying circuit for driving a load without the use of a power source or a battery; and
a MOS transistor having a source and a drain connected to an output of the storage circuit and the load, respectively, so that the load is connected to the storage circuit in accordance with a threshold voltage of the MOS transistor;
wherein the MOS transistor comprises a first MOS transistor; and further comprising a second MOS transistor having a drain connected to a gate of the first MOS transistor and a high-resistance resistor connected between the gate and the source of the first MOS transistor; wherein connection between the storage circuit and the load is established when the storage circuit is charged so that a voltage across the storage circuit reaches a voltage equal to the sum of the threshold voltage of the first MOS transistor and the threshold voltage of the second MOS transistor.

7. A power generation circuit according to claim 6; further comprising a third MOS transistor having a drain and a source connected to the drain and a source, respectively, of the second MOS transistor; wherein when the storage circuit is charged to a voltage equal to sum of the threshold voltage of the first MOS transistor and the threshold voltage of the second MOS transistor, the third transistor is turned ON in accordance with a signal from a control circuit contained in the load at the moment when the storage circuit and the load are connected so that the connection between the storage circuit and the load is maintained until the voltage across the storage circuit drops below the threshold voltage of the first MOS transistor.

8. A power generation circuit for generating and storing electric power utilizing electromagnetic wave energy, the power generation circuit comprising:
one of an antenna or a coil that receives an ambient electromagnetic wave;
a rectifying circuit that is formed on a silicon substrate and that rectifies a signal from the antenna or the coil receiving the ambient electromagnetic wave;
a storage circuit that stores an output power obtained from the rectifying circuit for driving a load without the use of a power source or a battery; and
a MOS transistor having a source and a drain connected to an output of the storage circuit and the load, respectively, so that the load is connected to the storage circuit in accordance with a threshold voltage of the MOS transistor;

wherein the MOS transistor comprises a P-channel MOS transistor; and wherein the source, the drain and a gate of the P-channel MOS transistor are connected to a positive terminal of the storage circuit, the load, and a negative terminal of the storage circuit, respectively.

9. A power generation circuit for generating and storing electric power utilizing electromagnetic wave energy, the power generation circuit comprising:

one of an antenna or a coil that receives an ambient electromagnetic wave;

a rectifying circuit that is formed on a silicon substrate and that rectifies a signal from the antenna or the coil receiving the ambient electromagnetic wave;

a storage circuit that stores an output power obtained from the rectifying circuit for driving a load without the use of a power source or a battery; and a MOS transistor having a source and a drain connected to an output of the storage circuit and the load, respectively, so that the load is connected to the storage circuit in accordance with a threshold voltage of the MOS transistor;

wherein the MOS transistor comprises an N-channel MOS transistor, wherein the source, a gate and the drain of the N-channel MOS transistor are connected to a negative terminal of the storage circuit, a positive terminal of the storage circuit, and the load, with the load being connected to the positive terminal of the storage circuit; and wherein when a voltage across the storage circuit becomes higher than the threshold voltage of the N-channel MOS transistor, the N-channel MOS transistor turns ON and connects the storage circuit to the load.

* * * * *